Patented July 22, 1952

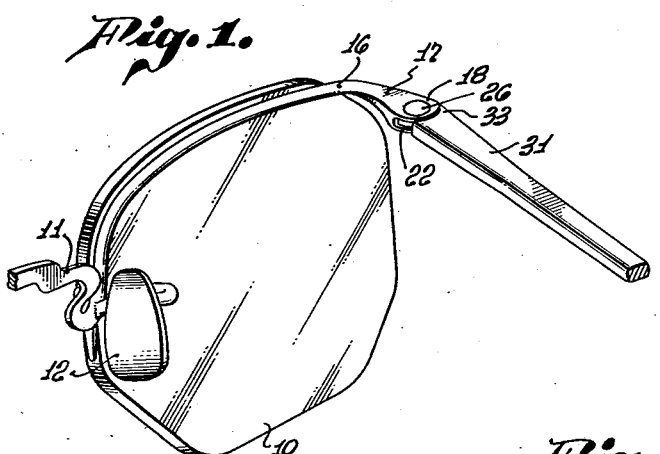
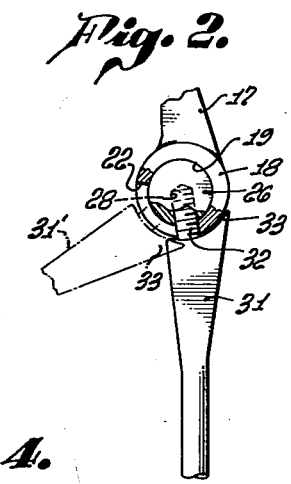
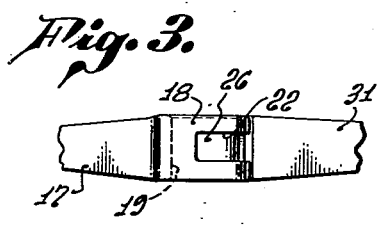
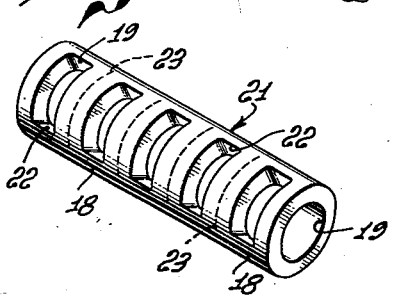
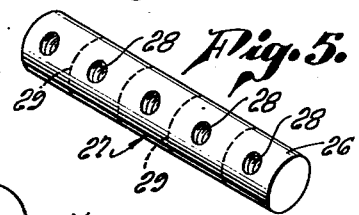
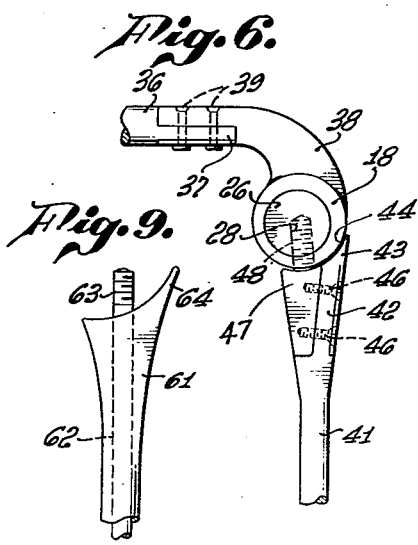
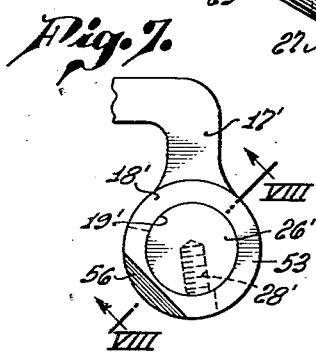
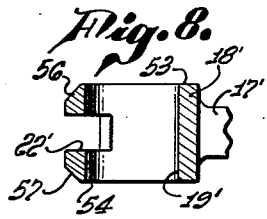
Harry O. Cohen, Inventor.

2,604,011

UNITED STATES PATENT OFFICE 2,604,011

OPHTHALMIC MOUNTING

Harry O. Cohen, Los Angeles, Calif.

Application January 6, 1950, Serial No. 137,244

4 Claims. (Cl. 88—53)

This invention relates generally to a pivotal mounting and particularly to a mounting for pivotally attaching a temple member to a frame of a pair of spectacles, sunglasses, goggles and the like.

The conventional pivotal attachment between a temple member and the frame of a pair of reading glasses includes a clevis attached to the frame member and a tongue attached to the temple member, the tongue being held between the arms of the clevis by a threaded screw passing through the tongue and clevis. It is a common observation that the screw thus holding the temple member to the frame becomes loosened in use and will fall out entirely if not periodically tightened. Moreover, if the screw is drawn up too tightly the temple members will not easily swing on their mountings with resulting inconvenience to the user in putting the glasses on or taking them off.

Furthermore, the component parts of such a conventional joint are relatively expensive to manufacture and the screw is normally so small as to be difficult to insert in the clevis. An unusually small screwdriver is necessary for assembly or disassembly, and after being tightened several times the head of the screw is generally damaged to an extent precluding further utility.

A pivotal connection in accordance with my invention overcomes the above disadvantages and affords the additional convenience that frequent flexing of the pivotal joint has no tendency to cause the pivot to loosen or become disengaged. Furthermore, the component parts of my invention lend themselves exceptionally well to economical mass production, with the result that the pivotal connection embodying the present invention can be marketed at a cost substantially below that of the conventional joint.

It is an object of my invention therefore to disclose a novel pivoted mounting for connecting a temple member to the frame of a pair of eyeglasses.

It is another object of this invention to provide an ophthalmic mounting allowing less play to the temple member than the conventional pivoted mounting.

A further object is to disclose a pivoted mounting of the above type particularly well adapted to modern mass production techniques.

Another object is to disclose such a mounting which may be easily assembled or disassembled without the use of tools.

A still further object is to provide a pivotal mounting of the type described which exhibits no tendency to become loosened after prolonged use.

A further object is to provide such a mounting which may be used with plastic rimmed spectacles as advantageously as with metallic framed spectacles.

These and other objects and purposes of my invention will become clear from a reading of the following description taken in connection with the accompanying drawings.

In the drawings:

Fig. 1 is a fragmentary perspective view of a spectacle lens and a portion of the frame, together with a portion of a temple member pivotally attached to the frame.

Fig. 2 is a fragmentary plan view on an enlarged scale, partially in section, of my pivoted mounting.

Fig. 3 is a fragmentary side elevational view of the mounting.

Fig. 4 is a perspective view of a bored and slotted cylinder as used in manufacturing my pivoted mounting.

Fig. 5 is a perspective view of a radially tapped rod from which bearing pins are cut for use in my invention.

Fig. 6 is a fragmentary plan view of a pivoted mounting in accordance with my invention as adapted for use with a non-metallic frame and temple member.

Fig. 7 is a fragmentary plan view of an alternative form of cylindrical sleeve of my invention.

Fig. 8 is a sectional view taken on line VIII—VIII of Fig. 7 with the bearing pin removed.

Fig. 9 is a fragmentary plan view of an alternate form of non-metallic temple member.

Generally speaking the present invention contemplates the provision of a cylindrical bearing sleeve fixed to each outermost end of the frame of a pair of eyeglasses, the axis of the sleeve being substantially parallel to the plane of the lens. Within the sleeve is rotatably carried a bearing pin provided with a threaded recess perpendicular to the axis of the pin, and an arcuate slot through the side wall of the cylindrical sleeve communicates with the interior affording access to the threaded recess. Each temple member is provided with an externally threaded end boss which projects through the arcuate slot and is threaded into the recess in the bearing pin.

In order to minimize the possibility of unintentional unscrewing of a temple member from the bearing pin, I provide a locking and contour finger extending angularly from the end of the temple member adjacent the threaded end boss. This finger is provided with a concave face and is so configured as to partially surround the outside of the cylindrical sleeve when the device is assembled and the temple members are opened outwardly from the spectacle frame. In a preferred form of my invention I provide means for insuring that the temple member cannot be unscrewed from the bearing pin except at a selected point in the swing of the temple member, this point being preferably midway of its swing from open to closed position.

Referring now in detail to Fig. 1, a lens 10 is attached in conventional manner to a frame member 11 which also carries a bridge rest 12 designed to rest on the bridge of the nose. A curved member 16 of the frame extends across the top of the lens to one side thereof and is provided with a portion 17 extending slightly rearwardly of the plane of lens 10. Portion 17 terminates in a virtually cylindrical end portion or bearing sleeve 18 having a vertically disposed, smooth bore 19. The construction of cylindrical portion 18 may be best understood by reference to Fig. 4 wherein is shown a preferred means for mass producing the cylindrical portion of my invention. Metallic stock 21 is provided with a cylindrical bore 19 extending therethrough. This bore 19 may be slightly eccentric with respect to the stock from which member 21 is formed for reasons more fully disclosed hereafter. On the outer surface of member 21 there is formed a plurality of slots 22, extending radially inwardly so that they communicate with internal bore 19. Each of slots 22 extends partially circumferentially around member 21 between 90° and 150° (say 120°) and are preferably so arranged that a radius of member 21 bisecting the arc of slot 22 passes through the narrowest annular portion of member 21 when bore 19 is eccentric with respect to stock 21. When member 21 has been bored and slotted as just described, cylindrical portions 18 may be removed therefrom by cutting along dotted line 23. Each cylindrical portion 18 may then be brazed or otherwise suitably attached to the end of portion 17 of frame 11, the axis of cylindrical portion 18 being vertically disposed as above mentioned when the spectacles are in wearing position.

The pivot pin 26 which fits slidably within bore 19 of cylindrical portion 18 may be manufactured from cylindrical bar stock of suitable outside diameter as shown in Fig. 5. Bar stock 27 has formed therein radially directed internally threaded recesses 28, and each pin 26 may be removed from pin stock 27 by parting along dotted line 29. The outside diameter of pivot pin 26 thus formed from pin stock 27 is so chosen as to permit a smoothly sliding fit with the inside diameter of bore 19 formed in member 21. When pivot pin 26 is mounted within bore 19, pin 26 is adjusted until tapped recess 28 is directed toward slot 22.

Temple member 31 is provided at its end with an externally threaded end boss 32 arranged to threadedly engage tapped recess 28 of pivot pin 26. Temple member 31 is also preferably provided with a locking and contour finger 33 having a concave surface adapted to receive the outside surface of cylindrical portion 18. It can be seen that threaded end boss 32 can be screwed into tapped recess 28 when pin 26 has been properly aligned within bore 19.

In order to maintain temple member 31 in threaded engagement with pivot pin 26 and prevent rotation of the temple member when in normal, wearing position with respect to the frame, I preferably make the outside diameter of cylindrical portion 18 slightly eccentric with respect to the internal bore 19 thereof. It can be seen that temple member 31, supported through its threaded end boss 32, may be pivotally swung about frame member 17, pivot pin 26 rotating approximately 90° within cylindrical bore 19. The inner surface of locking and contour finger 33 contacts the outer surface of portion 18 when the temple is in open position, as appears best in Fig. 2, and prevents disengagement of end boss 32 from threaded recess 28 by preventing rotation of the temple on the axis of boss 32. As mentioned previously, I preferably contour the surface of end 18, as by making cylindrical bore 19 slightly eccentric with respect to the outside diameter of cylindrical portion 18, with the result that locking and contour finger 33 is slightly displaced from contact with the external surface of cylindrical portion 18 when the temple member 31 is moved to a position substantially midway between its open or operative position (shown in solid line in Fig. 2) and its closed position substantially parallel to lens 10. This intermediate position is shown in dotted outline in Fig. 2 and it can be seen that the swinging of temple member 31 has caused locking and contour finger 33 to be displaced away from the outer surface of cylindrical portion 18. At this intermediate point the displacement is such as to allow unscrewing of end boss 32 from recess 28 and the device may be disassembled in this manner. Pivot pin 26 may be permitted to slide out of cylindrical portion 18 after unscrewing temple member 31. Assembly of my pivoted connection is accomplished by a sequence of operations the reverse of those just described for disassembly thereof.

It will be understood that the cylindrical sleeve 18 and temple end need not be manufactured in the precise manner described hereinabove but instead may be stamped, die formed, swedged, etc., as desired, either as separate units or as integral portions of frame and temple members.

In Fig. 6 is shown an adaptation of my invention for use with spectacles having a non-metallic frame and temple members. Frame member 36, corresponding to metallic member 16, is preferably provided with an extension of reduced dimension 37. Metallic member 38 may be attached to extension 37 by suitable means such as small rivets 39 extending through member 38 and extension 37. Non-metallic temple member 41 is also provided with an extension of reduced dimension 42 which at its tip is formed into a locking and contour finger 43 having a concave, forwardly directed surface 44 arranged to receive cylindrical portion 18. Attached to extension 42 as by rivets 46 is metallic connecting member 47 provided with a threaded end boss 48 similar to end boss 32 previously described. Metallic frame extension 38 terminates in cylindrical portion 18 identical to that previously described and pivot pin 26 is rotatably carried within cylindrical portion 18 in a manner similar to that discussed in connection with Fig. 2.

In Figs. 7 and 8 there is shown a modified form of the preferred embodiment of my invention. According to the structure there disclosed, as designated by primed numerals corresponding to the numerals of Fig. 2, portion 17' of a spectacle frame terminates in a virtually cylindrical end portion or bearing sleeve 18' having a smooth circular bore 19'. Within bore 19' there is slidably carried a bearing pin 26', identical in every respect to bearing pin 26 described hereinabove in connection with Fig. 2. Bearing sleeve 18' is provided with a radial slot 22' communicating with bore 19' and extending arcuately from about 90° to about 150° of the circumference of bearing sleeve 18'. Bore 19', in this form of the invention, is preferably concentric with the external cylindrical surface of bearing sleeve 18'.

Upon the upper surface 53 of bearing sleeve 18' I provide a chamfer 56 centered approximately midway of the arc of slot 22', and I preferably provide another chamfer 57 similarly located upon the lower surface 54 of sleeve 18'. It is apparent that when temple member 31 is assembled to frame 16 by threadedly engaging end boss 32 with threaded recess 28 of pin 26, locking and contour finger 33 can be rotated past upper and lower surfaces 53 and 54 only when temple member 31 is in the approximate center of its 90° swing. Thus the contouring of the outer surface of sleeve 18' performs the same function as does the eccentricity previously described, in locking temple member 31 in its correct position.

It will be evident to those skilled in the art that the chamfers 56 and 57 need not be made at 45° as shown, but may be at any desired angle and at any desired depth so long as locking and contour finger 33 is permitted to clear bearing sleeve 18 when temple member 31 is being assembled or disassembled.

In Fig. 9 there is shown an alternate form of temple member adapted for use in my invention. In order to strengthen non-metallic temple members of spectacles, it has become customary to form the non-metallic substance around an embedded metal rod. My pivoted mounting is especially suited for such construction as appears in Fig. 9. Plastic or other non-metallic temple member 61 has within it a metal rod 62 extending throughout the length of temple member 61. Rod 62 projects outwardly at the pivoted end of temple member 61, and terminates in a threaded end boss 63 formed integrally with rod 62. End boss 63 is constructed so that it may be threadedly received in threaded recess 28 of pivot pin 26, thus eliminating the necessity of providing a riveted or other similar connection between the temple member and the threaded end boss. Temple member 61 has formed thereon an integral locking and contour finger 64 for the purposes described above in connection with finger 43.

It is understood that the riveted connections shown in Fig. 6 may be made in any suitable manner and may include plates concealing the rivet heads if desired. My invention may be practiced in conjunction with rimless spectacles not provided with a frame member 16, wherein cylindrical bearing sleeve 18 is fastened directly to the glass of a lens as by a hole formed in the lens itself in accordance with practice well known in the art.

It will be noted that the configuration of locking and contour finger 33 in its relation to cylindrical portion 18 is such that the risk of accidental disengagement of temple member 31 from recess 28 in bearing pin 26 is minimized. Furthermore, in the preferred embodiments of the invention, temple member 31 cannot become disengaged from pivot pin 26 except when the temple member is positioned at the intermediate point of its approximately 90° swing, and hence the possibility of unintentional disassembly of the temple member from the frame is substantially eliminated. It will further be noted that the sliding surfaces providing the pivoting movement have no threaded engagement one with the other as has been true in the conventional pivoted mounting for temple members, and therefore prolonged use and movement of my pivoted mounting will not result in an accidental unscrewing or loosening of the connection.

Although I have shown certain embodiments of my invention, including modifications thereof, I do not desire to be limited to the specific forms shown. All modifications and changes coming within the scope of the invention are embraced by the following claims.

I claim:

1. In an ophthalmic mounting, including a frame and a temple member, a pivotal connection therebetween comprising: a sleeve attached to the frame, the rear half of the sleeve having a substantially cylindrical, vertical outer surface, said sleeve being provided with a vertical cylindrical bore therethrough and a pair of spaced, substantially annular, horizontal end surfaces, said sleeve having formed therein intermediate said end surfaces a radial slot extending about 120° arcuately of the sleeve and communicating said bore and outer surface, the radial distance from the center of the bore to the outer surface of the sleeve in the region of the end surfaces being appreciably less in alignment with the midpoint of the slot than the corresponding radial distances in alignment with the ends of the slot; a bearing pin pivotally carried in said bore and provided with an internally threaded, radially disposed recess directed toward said slot; and a temple member provided with an externally threaded end boss arranged to extend through the slot into threaded engagement with the recess, said temple member including an offset locking finger having a concave, forwardly directed face arranged to partially embrace the sleeve, whereby said temple member is permitted to be rotated about the axis of said end boss when the end boss is at the midpoint of the slot, and is restrained from such rotation when the end boss assumes other positions in the slot.

2. A device as stated in claim 1 wherein said cylindrical bore is eccentric relative to the substantially cylindrical portion of said sleeve.

3. A device as stated in claim 1 wherein the axis of said bore is parallel to the axis of the substantially cylindrical portion of the sleeve and is displaced therefrom.

4. A device as stated in claim 1 wherein the horizontal end surfaces are chamfered over a region in alignment with the midpoint of said slot.

HARRY O. COHEN.

REFERENCES CITED

The following references are of record in the file of this patent:

UNITED STATES PATENTS

| Number | Name | Date |
| --- | --- | --- |
| 362,377 | Hammel | May 3, 1887 |
| 1,394,863 | Reynolds | Oct. 25, 1921 |
| 1,504,212 | Carlson | Aug. 12, 1924 |
| 2,384,867 | Williams | Sept. 18, 1945 |